Figure 1:
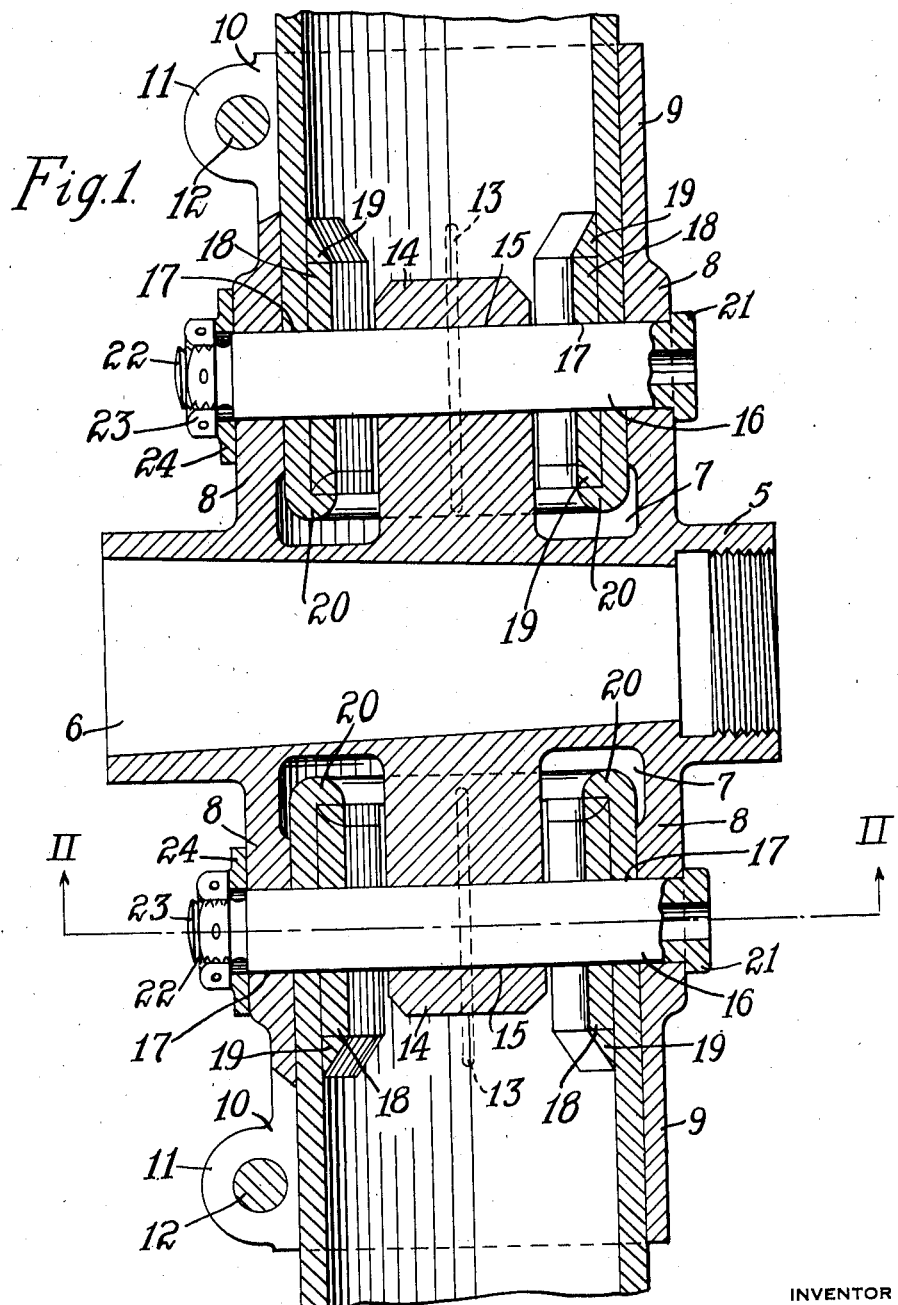

July 28, 1931. T. A. DICKS 1,816,317
PROPELLER
Original Filed June 13, 1928    2 Sheets-Sheet 1

INVENTOR
Thomas A. Dicks
By Green & McCallister
His Attorneys

July 28, 1931.   T. A. DICKS   1,816,317
PROPELLER
Original Filed June 13, 1928   2 Sheets-Sheet 2
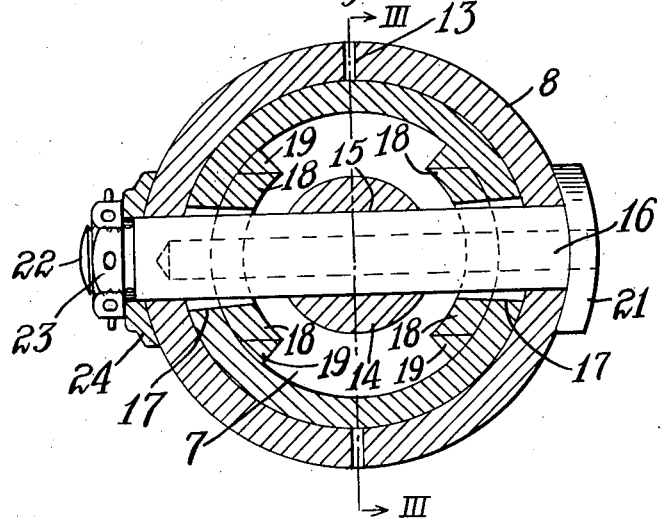
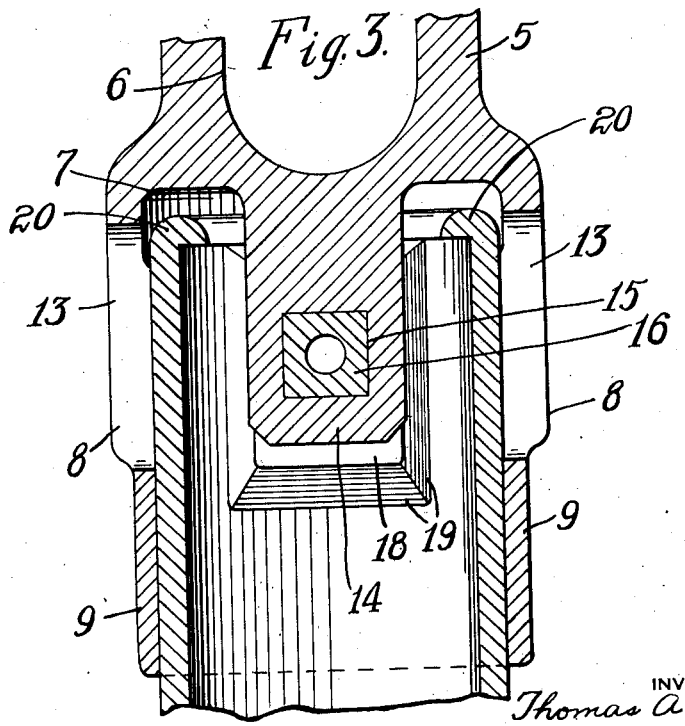
INVENTOR
Thomas A. Dicks
By Green & McCallister
His Attorneys Patented July 28, 1931

1,816,317

UNITED STATES PATENT OFFICE

THOMAS A. DICKS, OF PITTSBURGH, PENNSYLVANIA, ASSIGNOR TO PITTSBURGH SCREW AND BOLT CORPORATION, OF PITTSBURGH, PENNSYLVANIA, A CORPORATION OF PENNSYLVANIA

PROPELLER

Refile for abandoned application Serial No. 285,087, filed June 13, 1928. This application filed August 23, 1929. Serial No. 387,899.

The present application is a refile of my application Serial number 285,087 filed June 13, 1928, for propellers, which became abandoned on April 26, 1929.

This invention relates in general to air craft propellers in which the blades are detachably and adjustably secured in a hub construction.

Numerous attempts have been made to produce a construction of this general type by using interlocking shoulders and abutments, or in some instances by providing a threaded connection between the adjacent ends of the propeller blade and the hub, but in all of such cases, extreme care and expert workmanship must be exercised to provide a proper fit between the several parts. This necessarily entails high expense and adds materially to the ultimate cost of the propeller. It has also been found that propeller blades using such types of connections are difficult to set to the proper pitch which is absolutely necessary to avoid uneven pull of the blades, wobbling of the propeller during its operation, vibration and etc., all of which tend to rob the air craft of its highest motive force. Then again the interlocking shoulders and abutments or the threaded connections have been found to so tightly bind or set, due to the extremely high centrifugal action of the blades, that it is with difficulty that the blades may be detached when such is desired.

The principal object of the present invention resides in the novel manner of providing a detachable connection between the hub and the blade of the propeller which obviates all complex locking connections between the propeller blade and the hub.

Another object of the invention is the provision of a simple telescopic form of joint between the blade and the hub which joint is firmly retained by the use of a cross bolt or pin.

A further object of the invention resides in the novel manner of reinforcing or strengthening the walls of the hub and the propeller blade at the point where the connection is to be made.

A still further object of the invention resides in the yieldability of the wall of the socket arranged on the hub section so as to enable a clamping or gripping effect to be had when the cross bolt or pin is properly tightened or secured.

With these and other objects in view, as will readily present themselves to those skilled in this art, I will now proceed with the detailed description of the invention. In the accompanying drawings wherein similar letters of reference indicate like parts throughout the several views:

Fig. 1 is a longitudinal cross section showing the type of connection used in the present instance. Fig. 2 is a transverse section taken on the line 2—2 of Fig. 1, and Fig. 3 is a fragmentary longitudinal section taken on the line 3—3 of Fig. 2.

In the drawings attached hereto, I have shown a propeller construction provided with two diametrically opposite blades, but it will of course be understood that this number may be increased to any desired extent so long as the individual construction of the hub sockets and the type of connection is employed.

Referring more in detail to the drawings, 5 designates a hub provided with a transverse axial sleeve 6 into which a drive shaft is adapted to be secured in any appropriate or well-known manner. Integrally formed on the hub section 5 are socket members 7. Each of the sockets is provided with a relatively thickened portion adjacent its point of connection to the hub 5 as designated by the reference character 8 and a relatively reduced portion 9 which extends to the outer end of the socket. The socket 7 is longitudinally slit at its outer end as at 10 and provided with outwardly extending ears 11. The ears 11 are suitably apertured for the reception of a bolt 12. The thickened portion 8 of the socket 7 is longitudinally cut or slit as shown at 13 for a purpose which will be hereinafter described.

Arranged within each socket 7 and integrally formed with the hub portion 5 is a radially extending boss 14. This boss is provided with an aperture 15 which is adapted to receive the cross bolt 16.

The propeller blade shown in the present instance is of tubular construction and its inner end is adapted to be inserted within the socket 7 on the hub portion 5. Adjacent the inner end the propeller blades are suitably apertured as designated by the character 17 to permit the passage of the cross bolt 16. In order to reinforce the relatively thin wall of the tubular propeller blade at the point at which it is apertured, metallic blocks or inserts 18 are used. These blocks are suitably retained in their desired position by any of the well-known means of fastening one metallic member to another, but I preferably form this connection by welding as suggested at 19. The extreme inner end of the tubular propeller blade may be upset or inwardly flanged as at 20 which effectively forms a stop or shoulder against which the end of the metallic insert or reinforce 18 may rest. This flange 20 also materially strengthens the tubular end of the blade.

In the present case, I have shown the cross bolt or pin of angular formation, but it is, of course, understood that other types of cross keys may be employed if desired. One end of this cross key 16 is provided with an arcuate head 21 which is adapted to fit snugly against the outer peripheral wall of the socket portion 7. The opposite end of the cross bolt is threaded as at 22 for the reception of a nut 23. The cross bolt as well as the nut may be provided with apertures for the reception of a cotter pin or any other suitable type of fastening to firmly retain the nut in its tightly adjusted position. In the present case, I also preferably employ a washer 24, the inner face of which is curved to fit snugly against the outer wall of the hub portion 7 while its outer face is flattened and against which the nut 23 is adapted to bear.

The key apertures 17 through the tubular wall or root of the blade portion are slightly elongated as clearly shown in Fig. 2, this being for the purpose of permitting angular adjustment of the blade within the socket before said blade is finally clamped in position. This angular adjustment of the individual blades enables the mechanic to properly balance the propeller so that each individual blade will do its proportionate amount of work and without causing any vibration which would ultimately be carried to the drive shaft of the engine.

Upon insertion of the tubular end of the propeller blade, the various apertures are brought into registration and the cross bolt inserted therethrough. The individual propeller blades are then properly adjusted in regards to angle or pitch and are then tightly held in clamped position through the action of the cross key 16 and its associated nut 23. The cross bolt 12, positioned in the outer end of the socket, closes the latter so that it grips the tubular blade, and further reinforces the positioning of the blade. This latter action will tightly draw the inner portion of the socket around the inner end of the inserted tubular blade and during this action the walls of the thickened portion will yield slightly owing to the longitudinal slit 13.

The internally arranged boss 14 has been found to strengthen the cross connection effectively by medially supporting the cross bolt. This construction prevents any possible outward bend or twist upon the pin during the action of the propeller. It will of course be understood that during the revolution of airplane propellers, the blades are subjected to a terrific centrifugal, bending, and twisting force. To strengthen the propeller blades against these forces, an intermediate form of support has been provided at their point of cross connection to the hub socket.

When it is desired to replace any of the blades in case of damage, all that is necessary is to release and withdraw the cross pin and secondly, to loosen the cross bolt 12 in its bind or grip of the outer end of the socket upon the inserted blade. With the release of said parts the blade may be easily removed by simply withdrawing the same from its socket.

While I have described in the foregoing, the preferred form of my invention, I wish it understood that certain departures therefrom may be resorted to so long as the structure falls within the terms of the appended claims.

What I claim as new and desire to secure by Letters Patent is:

1. In a propeller, a hub having a series of sockets radiating therefrom, a hollow detachable blade having a cylindrical shank adapted to fit within each socket, each socket and the end of the blade inserted therein being provided with suitable openings for the reception of a cross bolt and means on said hub received within the shank of said blade to medially embrace the cross bolt.

2. In a propeller, a hub having a series of sockets radiating therefrom, a hollow detachable blade adapted to fit within each socket, each socket and the end of the blade inserted therein being provided with suitable openings for the reception of a cross bolt and an apertured boss arranged within each socket over which the end of the blade is positioned and through which the cross bolt extends.

3. In a propeller, a hub having a series of sockets radiating therefrom, a hollow detachable blade having a cylindrical shank adapted to fit within each socket, each socket and the end of the blade inserted therein being provided with suitable openings for the reception of a cross bolt, the openings in the end of the blade being elongated to permit angular adjustment of the blade within its socket and means projecting from the bottom of each socket into the shank of the blade for medially embracing the cross bolt.

4. In a propeller, a hub having a series of cylindrical bosses radiating from the outer surface thereof, a socket surrounding each boss, a hollow detachable blade adapted to fit within each socket and to surround the boss therein, the socket, the inserted end of the blade and the boss being provided with registering openings and a bolt passing through said openings to retain the blade in position.

5. In a hub for a propeller having a series of sockets radiating therefrom, a detachable blade adapted to fit within each socket, the inner portion of each socket being yieldable under clamping action to tightly embrace the inserted end of the blade and the outer portion of each socket being longitudinally split and provided with means to tightly clamp it about the shank of the inserted blade.

6. In a propeller, a hub having a series of integrally formed bosses protruding from the outer surface thereof, and an integrally formed socket surrounding each of said bosses, a hollow detachable blade adapted to fit within each socket and to surround the boss, the inserted end of the blade, the sleeve and the boss being provided with registering openings and a bolt passing throught the openings to lock the blade in position.

7. In a propeller, a hub having a series of integrally formed bosses thereon with a socket surrounding each boss, a hollow blade adapted to fit within the socket and over said boss in spaced relation thereto and means passing through suitable apertures in the socket, the blade and the boss to detachably retain the blade in its inserted position.

8. The combination with a propeller having a hub, of a plurality of integrally formed radially extending socket members, cylindrical bosses within said socket members, a plurality of detachable propeller blades, each blade having a hollow root adapted to fit within each socket member and over each boss for rotative adjustment thereon, and common means passing through registered openings in each socket member, blade root, and boss so that said blade can be rigidly secured to said hub.

9. The combination with a propeller provided with a hub, of a plurality of integrally formed radially extending socket members and bosses within said socket members, a plurality of detachable propeller blades, each blade having a hollow root adapted to fit within each socket member and over each boss for rotative adjustment thereon, each socket member, blade root, and boss being provided with registering openings for receiving a common bolt, each blade root opening being circumferentially elongated so that a propeller blade can be adjustably secured by one of said bolts to each integrally formed socket member and boss of said hub, and means on said socket for permitting it to yield under clamping action to securely hold the blade in its adjusted position.

10. The combination with a propeller blade provided with a hub, of a plurality of integrally formed radially extending socket members and bosses within said socket members, a plurality of detachable propeller blades, each blade having a hollow root adapted to fit within one of said socket members and over the boss therein, each blade root being inwardly flanged and adapted to form a stop for a reinforcing insert located therewithin, each socket member, blade root, reinforcing inserts, and boss being provided with registering openings for receiving a common bolt, the openings in each blade root and reinforcing inserts being circumferentially elongated so that the propeller blades may be adjustably secured to said hub.

11. The combination with a propeller blade provided with a hub, of a plurality of integrally formed radially extending socket members and bosses within said socket members, a plurality of detachable propeller blades, each blade having a hollow root adapted to fit within one of said socket members and over the boss therein, the socket members, blade roots, and bosses being provided with registering opening for receiving common securing means, the outer portion of each socket member being longitudinally split and provided with means for obtaining a tight clamping fit between each socket member and the shank of each inserted blade, the inner portion of each socket member being reinforced and provided with radial slits.

12. In a hub for a propeller having a plurality of sockets extending radially therefrom, an integrally formed boss projecting from the bottom of each socket, a propeller blade having a hollow shank adapted to fit within each of said sockets and surround said boss, a cross bolt extending through openings in the socket blade shank and a boss for locking the blade against longitudinal movement, means for securely clamping the outer end of the socket around said blade and means for permitting the inner and outer portions of the socket to be yieldable under clamping action.

13. In a hub for a propeller having a series of sockets radiating therefrom, a boss projecting from the bottom of each socket, and a hollow detachable blade adapted to fit within each socket and surround said boss, the inner portion of said socket being yieldable under a clamping action to tightly embrace the inserted end of the blade and the outer portion of each socket being longitudinally split and provided with means to tightly clamp it about the shank of the inserted blade.

14. In a hub for a propeller having a series of sockets radiating therefrom, a boss projecting from the bottom of each socket, and a hollow detachable blade adapted to fit within each socket and to surround said boss, the inner portion of each socket having a radial slit for permitting said socket to yield under a clamping action so as to tightly embrace the inserted end of the blade, and the outer portion of each socket being longitudinally split and provided with clamping means on opposite sides of said split for securely fastening the socket about the shank of the inserted blade.

15. A propeller blade having a hollow shank provided with an inwardly extending flange on the bottom thereof and reinforcing inserts supported on said flange.

16. A detachable propeller blade having a hollow shank provided with opening for securing said blade to a propeller hub, reinforcing inserts in said shank around said openings, and an inwardly extending flange on the lower end of said shank for supporting said inserts.

In testimony whereof, I have hereunto subscribed my name this 21st day of August, 1929.

THOMAS A. DICKS.